(12) United States Patent
Keith et al.

(10) Patent No.: US 6,382,908 B1
(45) Date of Patent: May 7, 2002

(54) NOZZLE FILLET BACKSIDE COOLING

(75) Inventors: Sean Robert Keith, Fairfield; Judd Dodge Tressler, Mason; Steven Robert Brassfield, Cincinnati; John Peter Heyward, Loveland, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/764,637

(22) Filed: Jan. 18, 2001

(51) Int. Cl.[7] ................................. F01D 9/06
(52) U.S. Cl. ..................... 415/115; 416/97 R
(58) Field of Search .................. 415/115, 915, 415/116, 97 R

(56) References Cited

U.S. PATENT DOCUMENTS 5,516,260 A * 5/1996 Damlis et al. ............. 415/115
6,200,087 B1 * 3/2001 Tung et al. ................ 415/115

* cited by examiner

*Primary Examiner*—Edward K. Look
*Assistant Examiner*—Kimya N McCoy
(74) *Attorney, Agent, or Firm*—William Scott Andes; Francis L. Conte

(57) ABSTRACT

A nozzle vane includes a row of trailing edge apertures and cooperating inboard slots joined in flow communication with a mid-chord cavity. An outboard slot is spaced outwardly from a respective last one of the inboard slots, and outboard of a respective last one of the trailing edge apertures. The outboard slot extends behind a fillet between the vane and a supporting band and is effective for backside cooling thereof.

19 Claims, 3 Drawing Sheets

NOZZLE FILLET BACKSIDE COOLING

CROSS REFERENCE TO RELATED APPLICATION

This application is related to U.S. patent application Ser. No. 09/604,127, filed Jun. 27, 2000, pending.

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases which flow downstream through turbine stages that extract energy therefrom. The high pressure turbine disposed directly downstream of the combustor includes an annular stator nozzle which directs the combustion gases towards a corresponding row of rotor blades extending outwardly from a rotor disk.

The turbine nozzle is formed in arcuate segments for reducing thermal stress therein as the nozzle expands and contracts during operation. Each nozzle segment typically includes a pair of stator vanes fixedly joined to outer and inner arcuate band segments. Since the nozzle vanes are directly exposed to the hot combustion gases, they and their bands are commonly formed of superalloys which maintain strength at elevated temperature.

In one common configuration, a single vane is integrally cast with outer and inner band segments to form a cast singlet, with two vane singlets being assembled together and brazed at axial splitlines to form a two-vane nozzle segment. Brazing provides a strong bond without degrading the high-strength performance of the superalloy nozzle material.

During engine operation, the nozzle is protected from the hot combustion gases by channeling a portion of compressor air inside the hollow vanes for internal cooling thereof, with the air being discharged through rows of film cooling holes extending through one or both sidewalls of the vanes. Since the vanes have airfoil configurations which taper to thin trailing edges, a row of trailing edge apertures is provided for discharging some of the cooling air through the trailing edge and cooling the thin trailing edge region of the vanes.

In one exemplary design, each vane includes a radially extending forward cavity behind the leading edge thereof, and a second radially extending aft cavity disposed at the mid-chord region of the vane between the forward cavity and the trailing edge region of the vane. The two cavities are separated by an internal imperforate bridge for isolating the two cooling circuits from each other.

The forward cavity includes an inlet through the inner band and is closed at the outer band for independently channeling cooling air therein for discharge from the film cooling holes around the leading edge region of the vane.

The aft cavity has an inlet through the outer band and is closed at the inner band for independently receiving cooling air therein which is discharged through film cooling holes of the vane sidewalls as well as through the trailing edge apertures.

Except for the corresponding cavity inlets in the opposite root ends of the vanes, the vane roots are solid or imperforate where they join the bands at corresponding fillets. The thin trailing edge region of each vane is cooled by a row of axially extending inboard slots which join the aft cavity to corresponding ones of the trailing edge apertures.

The trailing edge apertures are typically spaced inboard from the corresponding bands in axial alignment with their internal flow channels. Each trailing edge aperture is typically sized with a sufficient flow area for channeling therethrough a corresponding portion of the cooling air for cooling the trailing edge region of the vane down to and including the fillet interface with the bands.

A turbine nozzle of this exemplary design has been successfully used in commercial service in the United States for many years in first stage turbine nozzles of aircraft gas turbine engines. However, experience has shown that the fillets in the trailing edge region of the vanes are subject to oxidation and cracking over extended use which limits the useful life of the turbine nozzle. Oxidation is due to the relatively high temperature experienced by the fillets in this local region.

The cooling ability of the trailing edge apertures is at the useful limit since the size thereof is limited by maximum permitted stress during operation.

Accordingly, it is desired to provide a turbine nozzle having improved cooling of the fillets in the trailing edge region of the vane for reducing oxidation thereof and improving the useful life of the turbine nozzle.

BRIEF SUMMARY OF THE INVENTION

A nozzle vane includes a row of trailing edge apertures and cooperating inboard slots joined in flow communication with a mid-chord cavity. An outboard slot is spaced outwardly from a respective last one of the inboard slots, and outboard of a respective last one of the trailing edge apertures. The outboard slot extends behind a fillet between the vane and a supporting band and is effective for backside cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
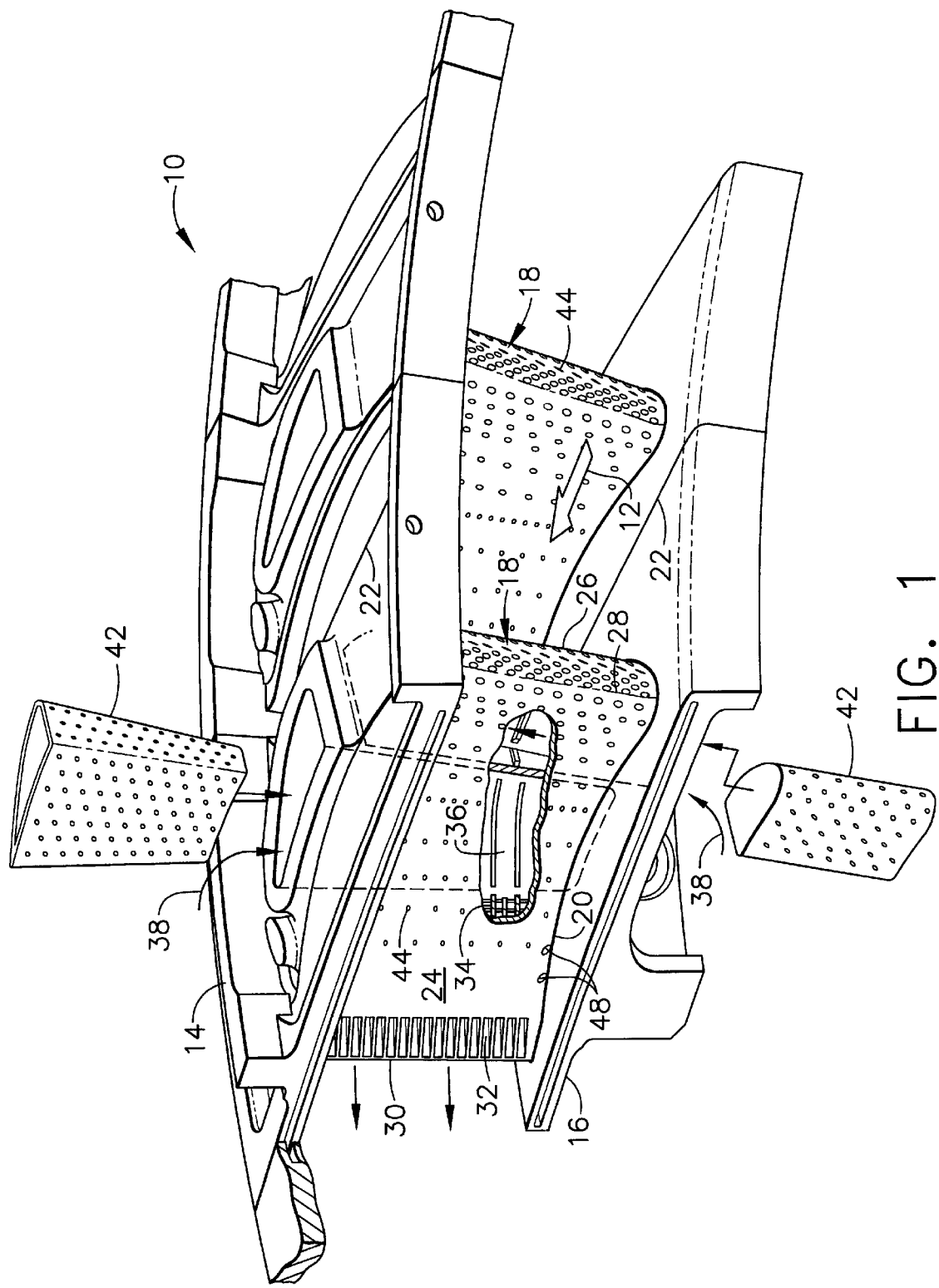
FIG. 1 is an isometric view of a portion of an annular turbine nozzle in accordance with an exemplary embodiment of the present invention.

Illustrated in FIG. 1 is a portion of an axisymmetrical first stage turbine nozzle 10 of a high pressure turbine disposed directly downstream from a combustor (not shown) of a turbofan aircraft gas turbine engine. During operation, hot combustion gases 12 are discharged from the combustor and channeled through the nozzle 10 which directs the gases between turbine rotor blades (not shown) extending outwardly from the perimeter of the rotor disk being powered thereby.

The nozzle includes arcuate outer and inner bands 14,16 integrally cast to a pair of hollow vanes 18 at corresponding arcuate fillets 20 therebetween. Preferably, a single vane is integrally cast at opposite root ends thereof with corresponding portions of the outer and inner bands in a unitary singlet. Two singlet vanes 18 are then brazed together at corresponding axial splitlines 22 to form an integrated two-vane nozzle segment. The segments are conventionally joined together in a full segmented ring to define the annular nozzle.

The vanes are spaced circumferentially apart from each other and extend radially between the bands. Each vane has radially outer and inner roots at opposite ends thereof at which the fillets 20 are exposed to the hot combustion gases during operation.

As shown in FIG. 1, each of the vanes 18 has an airfoil profile with a first or pressure sidewall 24, which is generally concave, and a second or suction sidewall 26, which is generally convex, joined together at chordally opposite leading and trailing edges 28,30 which extend radially along the span of the vane between the two bands.

Figure 2:
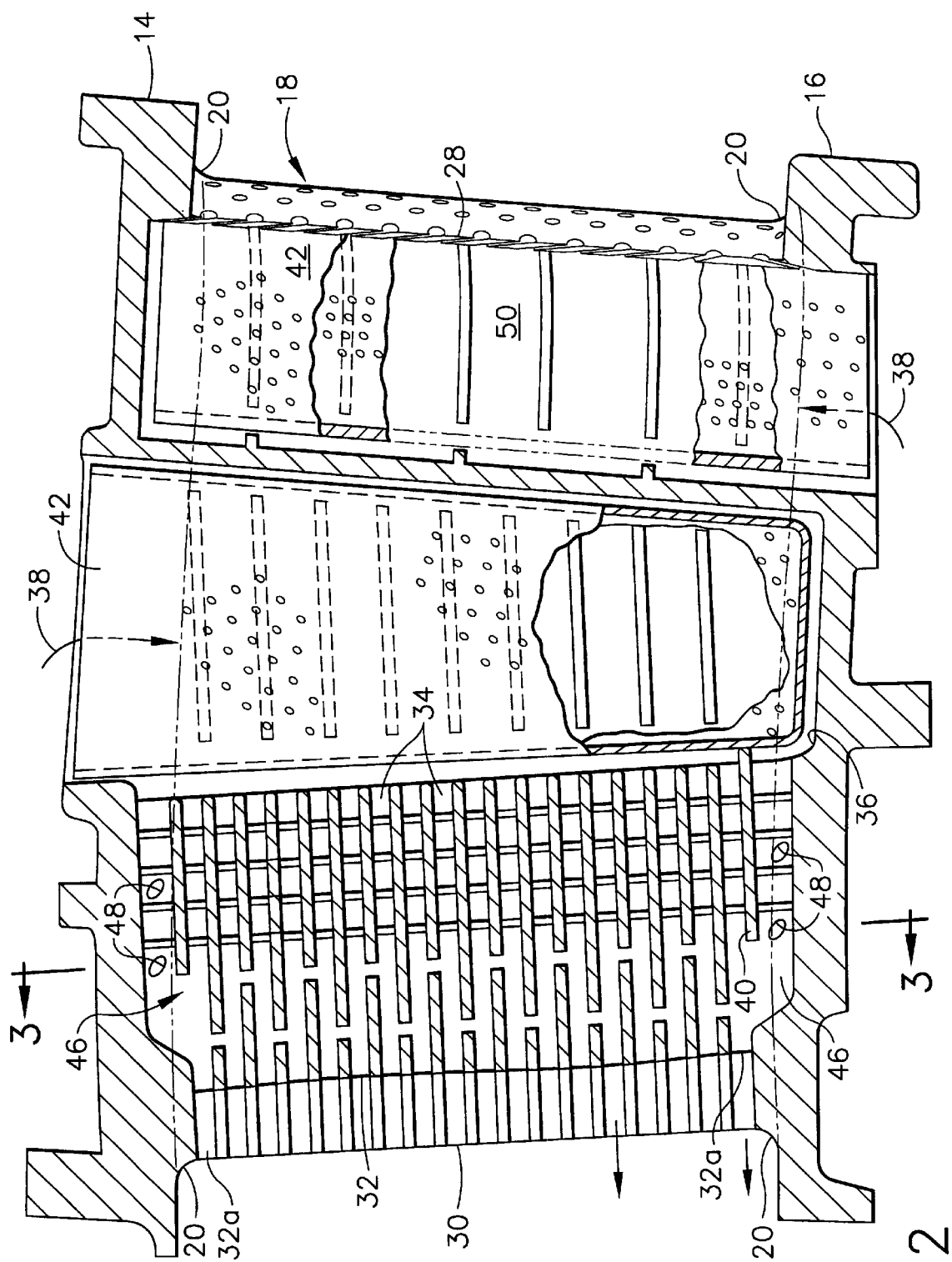
FIG. 2 is an axial sectional view through one of the vanes illustrated in FIG. 1.

As shown in FIGS. 1 and 2, each vane includes a row of trailing edge apertures 32, and cooperating inboard axial channels or slots 34 extending inside the trailing edge region of the vane in flow communication with a mid-chord cavity 36. The inboard slots 34 are disposed radially inboard between both bands 14,16 behind the vane sidewalls which are directly exposed to the hot combustion gases.

The outer and inner vane roots are imperforate or solid between the trailing edge 30 and the mid-chord cavity 36 except for an outer inlet for the mid-chord cavity 36 which extends through the outer root and outer band for receiving pressurized cooling air 38 bled from the compressor (not shown) of the engine.

As shown in FIG. 2, the internal inboard slots 34 are defined by corresponding radially spaced apart axial ribs 40 which bridge the opposite sidewalls of the vane. The inboard slots extend in a radial row and have corresponding inlets at the mid-chord cavity 36 for receiving the cooling air therefrom which is then channeled axially aft through the trailing edge region of the vane for discharge through the corresponding trailing edge apertures 32.

The cavity 36 may include radially spaced apart stand-off ribs extending axially for centering a conventional perforate impingement baffle 42. The individual inboard slots 34 include chordally spaced apart turbulators extending radially for enhancing internal cooling of the vane from the spent impingement air discharged from the mid-chord cavity.

Turbulators are conventional, and are configured as elongate ribs which extend partly inwardly from the inner surfaces of the vane for tripping the cooling air as it flows thereover. In this way, the mid-chord cavity 36 and the array of inboard slots 34 provide effective internal cooling of the vane from its mid-chord region down to the trailing edge from which the cooling air is discharged through the trailing edge apertures 32.

As shown in FIG. 1, both sidewalls of the vane may include conventional film cooling holes 44 extending therethrough in flow communication with the mid-chord cavity 36 and inboard slots 34, for example, for discharging the cooling air therefrom to create protective films of cooling air over the exposed outer surface of the vane.

As initially shown in FIG. 1, the trailing edge apertures 32 are spaced inboard from the inner surfaces of the two bands and away from the fillets 20. FIG. 2 illustrates in more detail that each vane includes a pair of trailing edge terminal or last apertures 32a which are the outboard-most ones thereof directly adjacent to the outer and inner bands, respectively, and the corresponding fillets 20 thereat.

In accordance with a preferred embodiment of the present invention as illustrated in FIG. 2, each vane further includes a pair of outboard channels or slots 46 cooperating with respective ones of the last trailing edge apertures 32a at respective opposite root ends of each vane for backside cooling the fillets 20 at both the outer and inner bands. The outboard slots 46 are similar to the inboard slots 34 and extend axially in flow communication between the respective last apertures 32a and the common mid-chord cavity 36.

The outboard slots 46 extend at least in part through the otherwise solid vane roots below the exposed inner surfaces of the bands and behind the corresponding fillets 20 illustrated in phantom line in FIG. 2. In this way, the cooling air 38 from the mid-chord cavity 36 may be channeled directly behind the fillets in the thin trailing edge region of the vane for discharge from the last apertures 32a. The fillet in this local area is therefore additionally cooled for reducing or preventing oxidation thereof and further improving the useful life of the turbine nozzle.

Figure 3:
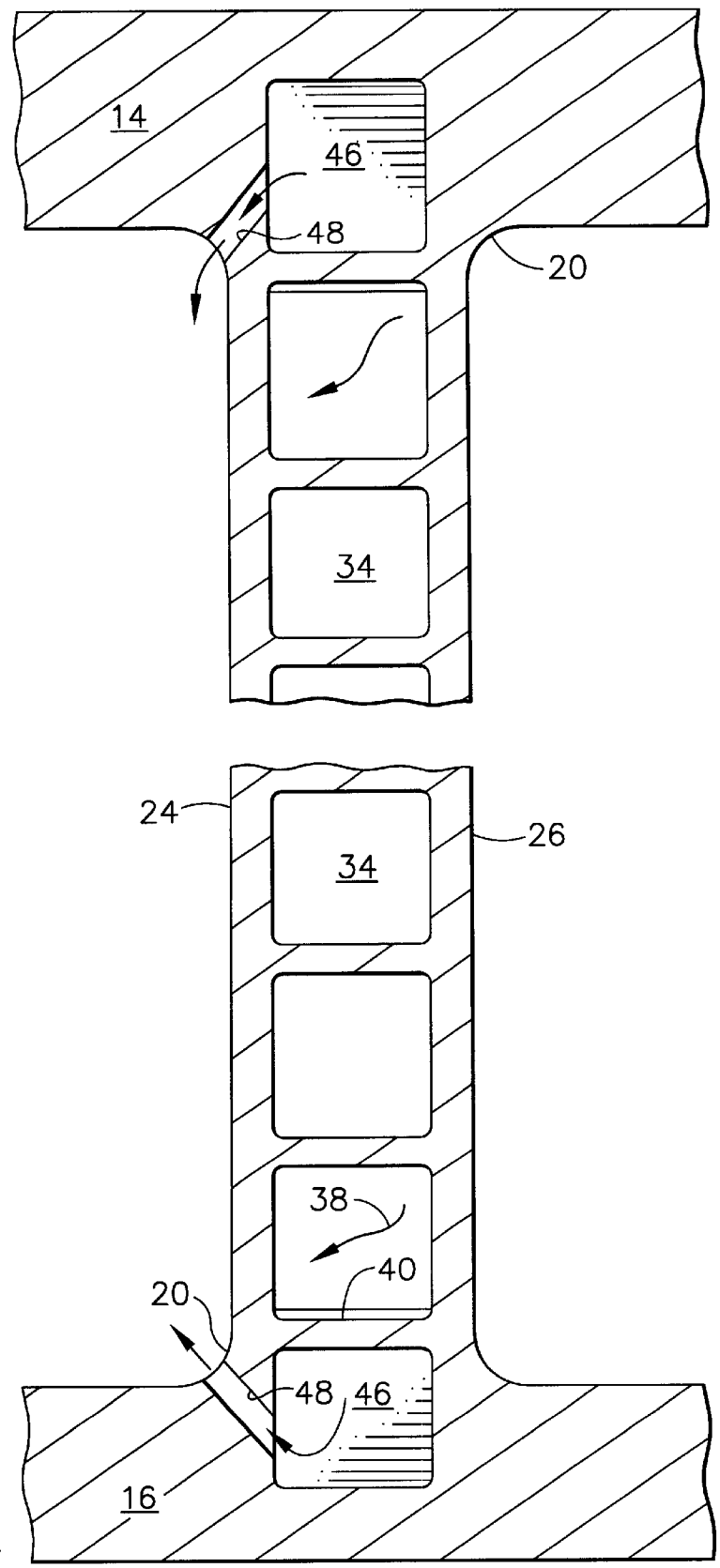
FIG. 3 is a radial sectional view through the vane illustrated in FIG. 2 and taken along line 3—3.

As shown in FIG. 3, the vane sidewalls 24,26 are spaced apart to define the internal flow passages therethrough, and the outboard slots 46 at opposite root ends thereof extend between both sidewalls for backside cooling the corresponding fillets 20 along both sidewalls near the vane trailing edge.

As shown in FIG. 2, both outboard slots 46 preferably extend substantially straight from the mid-chord cavity 36 toward the trailing edge 30 and locally bend or jog at the aft ends thereof to cross behind the corresponding fillets 20 to terminate at the respective last trailing edge apertures 32a. In this way, the fillet is backside cooled from the mid-chord cavity aft to the trailing edge apertures 32a with the cooling air then being discharged therefrom.

In the exemplary embodiment illustrated in FIG. 1, the trailing edge apertures 32 are located slightly forward of the trailing edge itself and breach the pressure side of the vane, with the suction side of the vane remaining imperforate. This trailing edge region of the vane is aerodynamically thin, and the outboard slots 46 provide effective backside cooling of the fillets as the cooling air is channeled therethrough and discharged from the last apertures.

As shown in FIG. 2, the array or bank of inboard slots 34 channels cooling air axially aft from the mid-chord cavity 36 for discharge from respective ones of the trailing edge apertures 32 for cooling the thin trailing edge region of each vane radially between the two bands. The pair of outboard slots 46 are similarly disposed in axial flow communication between the mid-chord cavity 36 and respective ones of the last trailing edge apertures 32a for providing additional cooling into the corresponding vane roots behind respective portions of the fillets 20.

As indicated above, the last trailing edge apertures 32a are suitably spaced away from the fillets 20 at the corresponding outer and inner bands. Accordingly, each of the outboard slots 46 preferably terminates in common with an adjacent or outboard last one of the inboard slots 34 at a respective ones of the last apertures 32a. In this way, the cooling air channeled through each outboard slot 46 joins air channeled through the adjoining inboard slot 34 for discharge through the common last aperture 32a.

However, each trailing edge aperture 32,32a is specifically sized for discharging cooling air at a desired flowrate. The size of the last aperture 32a may accordingly be limited by stress limits imposed on the vane and may be insufficient for discharging air from both its dedicated inboard slot 34 and the additional outboard slot 46.

Accordingly, each of the vanes 18 may further include one or more side apertures or outlets 48 extending through one or both sidewalls 24,26, as shown in FIGS. 2 and 3, in flow communication with a respective one of the outboard slots 46 for additionally discharging the cooling air therefrom.

As shown in FIG. 3, the side outlets 48 preferably begin in each of the outboard slots 46 below the fillets 20 on the pressure sidewall 24, and exit the sidewall away from the corresponding fillets 20 to directly cool the fillets. The side outlets 48 may be disposed through both vane sidewalls 24,26 at both outer and inner bands, if required, although the side outlets are preferably used solely in the pressure sidewall to minimize nozzle efficiency losses, which would be greater on the suction sidewall.

Each fillet 20 may therefore be backside cooled from the outboard slot 46 recessed into the bands; internally cooled through the side outlets 48; and film cooled by the air discharged from the side outlets.

The number and specific location of the side outlets 48 may be determined for each design application for ensuring suitable flowrate through the outboard slots 46 for enhancing fillet cooling thereat. In the preferred embodiment illustrated in FIG. 2, the side outlets 48 are disposed in pairs at each fillet along each sidewall. The outlets are chordally spaced apart from each other to provide more continuous film cooling along the trailing edge portion of the fillet.

As illustrated in FIG. 2, the turbine nozzle 10 may be made by initially forming the vanes 18 and outer and inner band segments in a conventional manner such as by casting. All of the internal features of the individual vanes 18 may be formed by suitably casting the vanes 18 to include the mid-chord cavity 36 with its outer band inlet, and the cooperating axial slots 34,46 which discharge the cooling air through the trailing edge apertures 32.

In a typical first stage, high pressure turbine nozzle configuration each vane 18 preferably also includes a radially extending forward cavity 50 having a bottom inlet through the inner band 16 which receives the cooling air 38. The outer band 14 is solid or imperforate at the forward cavity 50. And, the forward cavity 50 and the mid-chord cavity 36, which is aft relative to the forward cavity, are separated from each other by an integral imperforate bridge extending between the two sides of the vane for providing independent cooling circuits. The forward cavity 50 is configured in any conventional manner, including another impingement baffle 42, for cooling the leading edge portion of each vane, with the cooling air being discharged through various rows of additional film cooling holes 44 in a conventional manner.

Accordingly, the vane 18 illustrated in FIG. 2 may be initially cast for forming all the desired internal cooling features thereof including the inboard and outboard slots 34,46. Typically, the trailing edge apertures 32,32a may also be formed in the casting process, or may be otherwise formed or drilled after casting. The film cooling holes 44, and the side outlets 48, if used, may then be suitably drilled through the cast vanes in any conventional manner.

The resulting turbine nozzle 10 illustrated in FIG. 1 then enjoys all of the advantages of the original turbine nozzle, but now includes the additional outboard slots therein for improving backside cooling of the fillets 20 between the mid-chord cavity 36 and the trailing edge apertures. The resulting turbine nozzle therefore will enjoy improved useful life and durability due to reduction or elimination of fillet oxidation in this region.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A turbine nozzle comprising:

outer and inner bands integrally cast to a pair of vanes at corresponding fillets therebetween; and each of said vanes includes a last trailing edge aperture spaced inboard from said fillet and disposed in flow communication with an outboard slot extending behind said fillet for channeling cooling air from a mid-chord cavity of said vane to said last aperture for backside cooling said fillet therealong.

2. A nozzle according to claim 1 wherein each of said vanes further comprises opposite sidewalls joined together at opposite leading and trailing edges; and said outboard slot extends between said sidewalls for backside cooling said fillets along both said sidewalls near said trailing edge.

3. A nozzle according to claim 2 wherein said outboard slot extends substantially straight from said mid-chord cavity toward said trailing edge, and bends at an aft end thereof to cross behind said fillet to terminate at said last aperture.

4. A nozzle according to claim 3 wherein each of said vanes includes a pair of said last trailing edge apertures and cooperating pair of outboard slots at respective opposite root ends thereof for backside cooling said fillets at both said outer and inner bands.

5. A nozzle according to claim 4 wherein each of said vanes further comprises:

a row of trailing edge apertures, including said pair of last apertures adjacent said outer and inner bands; and an array of inboard slots disposed between said pair of outboard slots in flow communication between said mid-chord cavity and respective ones of said trailing edge apertures.

6. A nozzle according to claim 5 wherein each of said outboard slots terminates in common with an adjacent one of said inboard slots at a respective one of said last apertures.

7. A nozzle according to claim 6 wherein each of said vanes further comprises a side outlet extending through one of said sidewalls in flow communication with a respective one of said outboard slots for discharging said cooling air therefrom.

8. A nozzle according to claim 7 wherein said side outlet extends through one of said fillets.

9. A nozzle according to claim 8 wherein respective ones of said side outlets are disposed through both sidewalls of said vanes.

10. A nozzle according to claim 9 further comprising a pair of said side outlets extending through each of said fillets along each of said sidewalls.

11. A nozzle according to claim 9 wherein each of said vanes is an integral casting with corresponding portions of said bands in a unitary singlet, and two of said vane singlets are brazed together at said bands.

12. A nozzle according to claim 11 wherein said outer and inner bands are imperforate at said outboard slots.

13. A nozzle vane singlet comprising a hollow vane integrally cast at opposite ends thereof with outer and inner bands, and said vane includes a row of trailing edge apertures and cooperating inboard slots joined in flow communication with a mid-chord cavity, and a pair of outboard slots spaced outwardly from respective last ones of said inboard slots at opposite ends of said vane and outboard of respective last ones of said trailing edge apertures.

14. A vane singlet according to claim 13 wherein each of said outboard slots terminates in common with an adjacent one of said inboard slots at a respective one of said last apertures.

15. A vane singlet according to claim 14 wherein said vane further comprises opposite sidewalls joined together at opposite leading and trailing edges; and said outboard slot extends between said sidewalls for backside cooling both said sidewalls near said trailing edge.

16. A vane singlet according to claim 15 wherein said outboard slots extend substantially straight from said midchord cavity toward said trailing edge, and bend at an aft end thereof to cross over to said last inboard slots at said trailing edge.

17. A vane singlet according to claim 16 further comprising a side outlet extending through one of said sidewalls in flow communication with a respective one of said outboard slots for discharging cooling air therefrom.

18. A vane singlet according to claim 17 wherein said vane joins said outer and inner bands at respective fillets, and said side outlet extends through one of said fillets.

19. A vane singlet according to claim 18 further comprising a pair of said side outlets extending along said one sidewall.

* * * * *